United States Patent [19]

Stemmer

[11] Patent Number: 5,704,953
[45] Date of Patent: Jan. 6, 1998

[54] FORCED AIR SYSTEM AIR FILTER

[75] Inventor: Michael J. Stemmer, Collierville, Tenn.

[73] Assignee: Air Kontrol, Inc., Batesville, Wis.

[21] Appl. No.: 624,135

[22] Filed: Mar. 29, 1996

[51] Int. Cl.⁶ .................................................. B01D 46/12
[52] U.S. Cl. ............................ 55/483; 55/487; 55/497; 55/511; 55/521; 55/DIG. 39
[58] Field of Search .......................... 55/483, 486–488, 55/497, 499, 511, 521, 527, DIG. 39

[56] References Cited

U.S. PATENT DOCUMENTS

| | | | |
|---|---|---|---|
| 1,734,125 | 11/1929 | Greene | 55/488 |
| 2,327,184 | 8/1943 | Goodloe | 55/487 |
| 2,915,426 | 12/1959 | Poelman | 154/93 |
| 3,290,870 | 12/1966 | Jensen | 55/486 |
| 3,494,113 | 2/1970 | Kinney | 55/521 X |
| 3,692,184 | 9/1972 | Miller et al. | 210/437 |
| 3,871,851 | 3/1975 | Neumann | 55/521 |
| 3,905,787 | 9/1975 | Roth | 55/488 |
| 4,187,091 | 2/1980 | Durre et al. | 55/499 |
| 4,323,374 | 4/1982 | Shinagawa et al. | 55/486 X |
| 4,340,402 | 7/1982 | Catron | 55/511 X |
| 4,376,642 | 3/1983 | Verity | 55/499 X |
| 4,737,174 | 4/1988 | Pontius | 55/511 X |
| 4,902,306 | 2/1990 | Burnett et al. | 55/486 X |
| 4,904,288 | 2/1990 | d'Augereau | 55/487 X |
| 5,037,455 | 8/1991 | Scheineson et al. | 55/487 X |
| 5,098,767 | 3/1992 | Linnersten | 428/182 |
| 5,102,436 | 4/1992 | Grabowski | 55/483 |
| 5,183,488 | 2/1993 | Deering | 55/483 X |
| 5,236,480 | 8/1993 | Svensson et al. | 55/497 X |
| 5,238,476 | 8/1993 | Svensson et al. | 55/487 X |
| 5,288,298 | 2/1994 | Aston | 55/486 X |
| 5,423,903 | 6/1995 | Schmitz et al. | 96/134 |
| 5,501,794 | 3/1996 | Vande Graaf et al. | 55/497 X |
| 5,578,113 | 11/1996 | Glenn | 55/DIG. 39 |

Primary Examiner—Robert Spitzer
Attorney, Agent, or Firm—Foley & Lardner

[57] ABSTRACT

An HVAC filter having a pleated paper filter and a plastic pre-filter, the filter and pre-filter are mounted in a parallel relation in the frame. The plastic pre-filter includes a plastic mesh having a plurality of openings, and an irregular surface on the inlet side to prevent matting of filtered material.

19 Claims, 1 Drawing Sheet

FORCED AIR SYSTEM AIR FILTER

FIELD OF THE INVENTION

The present invention relates to an air filter for forced air heating, ventilating and/or air conditioning ("HVAC") systems. More specifically, the present invention relates to an air filter provided with a pre-filter positioned to prevent large particles of dust or dirt from clogging the main filter element.

BACKGROUND OF THE INVENTION

Pleated paper filter elements of the type used in forced air systems require replacement as soon as the surfaces are covered by dust and dirt particles which clog the paper filter, prevent further filtration and restrict air flow. For a given air flow and dust or dirt concentration, the useful life of the filter or time between cleaning depends on its surface area. Thus, to increase the useful life of a filter element, the surface area is typically increased.

Depending upon the application, filter life and size are varied in relation to each other and cost. However, it would be desirable to provide a pre-filter device which can be inexpensively added to a pleated paper air filter to increase the useful life of a filter element having a given area. It would also be desirable to provide a reusable and cleanable polypropylene screen configured to pre-filter the air stream passing through the paper filter to remove large particles and thereby prolong the life of the air filter.

It would also be desirable to provide an improved pre-filter which is seated tightly on the main filter and, depending upon the application, separable from the main filter.

SUMMARY OF THE PRESENT INVENTION

The present invention relates to an air filter including a frame, a pleated filter element supported by the frame, and a plastic pre-filter. The pre-filter is supported by the frame in a side-by-side relationship with the pleated filter to filter air which passes through the pleated filter. In one embodiment, the pre-filter may be a woven, plastic mesh.

The present invention further relates to an air handling unit. The unit includes a filter support; and a filter assembly supported by the support within the path of airflow through the air handling unit. The filter assembly includes a frame, a pleated filter element supported by the frame, and a plastic pre-filter. The pre-filter is supported by the frame in a side-by-side relationship with the pleated filter to filter air which passes through the pleated filter. In one embodiment, the filter assembly is supported generally perpendicular to the airflow direction; however, the filter assembly could also be supported at an angle which is not perpendicular to the air flow direction.

Figure 1:
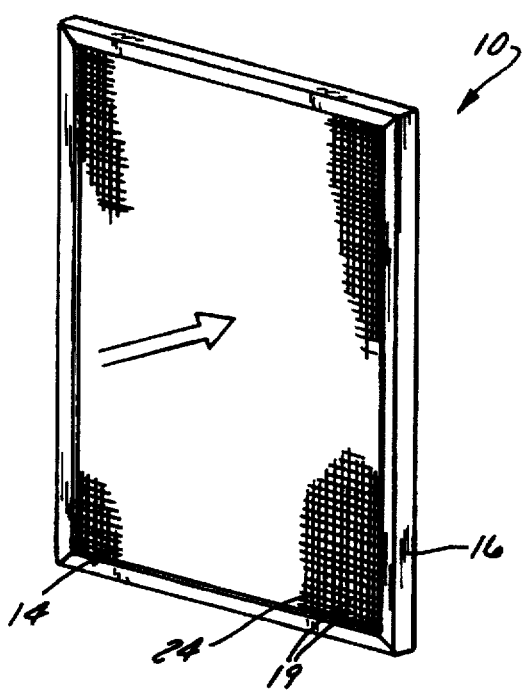
FIG. 1 is a perspective view of the front or inlet side of the preferred embodiment of an air filter according to the present invention.
Figure 2:
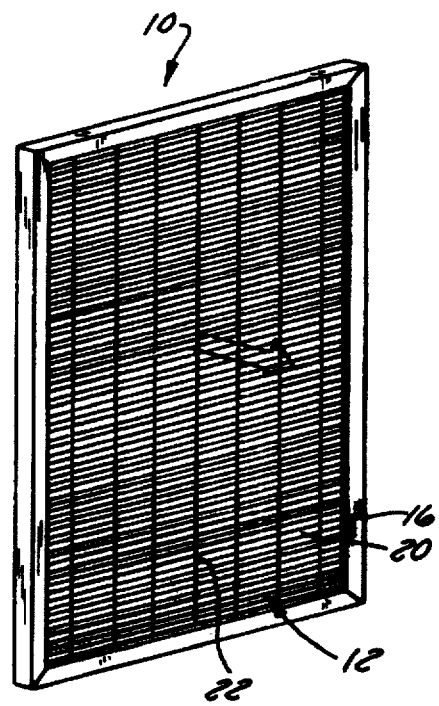
FIG. 2 is a perspective view of the back or outer side of the air filter.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 3:
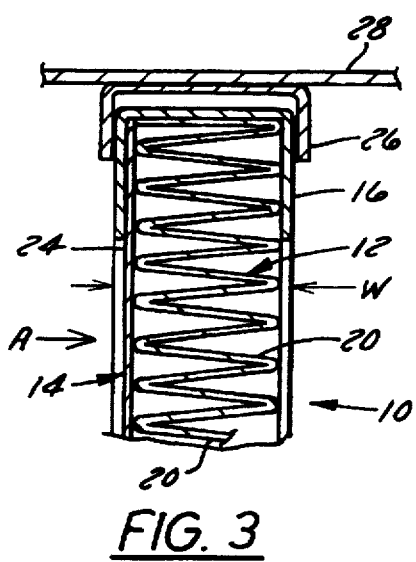
FIG. 3 is a cross section view of a portion of the air filter showing the relationship of the pleated filter with a pre-filter mesh in the frame.
Figure 4:
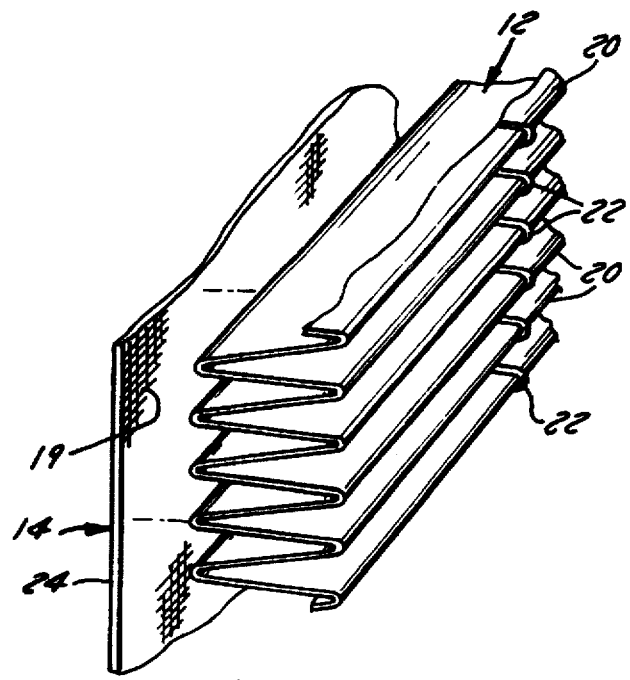
FIG. 4 is a perspective view showing the relationship of the mesh to the pleated filter.

Referring to the Figures, an air filter unit 10 according to the present invention generally includes a pleated main filter element 12 and a pre-filter 14 supported in a side-by-side relationship by a support structure such as a frame 16. As best illustrated in FIG. 3 the filter element 12 is located downstream from pre-filter 14.

In the preferred embodiment, filter element 12 is formed from a pleated, non-woven paper filter material 20. Filter material 20 is held together in its pleated form by adhesive tracks 22 (e.g. hot-melt glue) formed on two sides of the pleated filter material. The filter element 12 is arranged so that one set of the alternating folds which form the pleats substantially intersect a first plane defining an inner surface and the other set of folds substantially intersect a second plane which defines an outer surface. By way of example, the paper filter material may be a wet layered paper including fiberglass fibers such as that manufactured by Vose Co. of Hollingsworth, Mass. referred to as a 60–65% ASHRAE paper. Furthermore, the density of pleats can be varied to vary filter life and/or efficiency. In the preferred embodiment, the total area of filter material to filer unit area may range from 8-to-1 to 12-to-1.

In the preferred embodiment, pre-filter 14 is formed from a plastic (e.g. polypropylene) mesh. The mesh is formed with woven strands or fibers. In the preferred embodiment, the filters may be varied in diameter and spacing to provide an irregular surface and variable sizing of the passages through the mesh. The mesh thus has a plurality of openings 19 surrounded by an irregular surface 24 on the inlet side of the pre-filter 14. By way of example, the mesh may be of the type manufactured by Synthetic Industries or Wendell Inc. having product nos. 80259000 and PA549321, respectively. The irregular surface 24 extends the life of the pleated filter 12 by preventing matting of the particles (e.g. dust, dirt, etc.) on the surface of pre-filter 14 which substantially prevents particles from reaching and clogging pleated filter 12. Additionally, when pre-filter 14 is made from an appropriate plastic such as polypropylene, it becomes electrostatically charged when air flows therethrough. Thus, the filtering efficiency of pre-filter 14 is increased when formed from a chargeable plastic.

Frame 16 is formed from a generally V-shaped channel material such as an extruded aluminum or plastic. The channel is fabricated in a rectangular shape sized as required to fit in an associated air handling unit (e.g. HVAC blower unit). The channel may be cold formed, heat formed, glued, or welded at the corners to join the channels of the frame.

Filter 12 and pre-filter 14 are supports in the side-by-side, parallel relationship by frame 16. By way of example, filter 12 and pre-filter 14 may be glued together at their perimeters, and glued within the channels of frame 16. Depending upon the application, a gap may be left between the filter and pre-filter.

In General, filter unit 10 can be used in place of a conventional replaceable filter in a residential or commercial HVAC air handling or blower unit. Referring to FIG. 3, filter unit 10 is shown positioned in reference to a guide channel and support 26 of a conventional air handling unit 28 (partially shown). Frame 16 of filter unit 12 rests within guide channel 26 (i.e. filter support), and an associated lower channel (not shown) to hold unit 12 within, and/or generally perpendicular to, the air stream represented by A to filter particles from the stream.

Thus, it should be apparent that there has been provided in accordance with the present invention a furnace air filter that fully satisfies the objectives and advantages set forth above. Although the invention has been described in conjunction with specific embodiments thereof, it is evident that many alternatives, modifications and variations will be apparent to those skilled in the art. For example, the preferred width (W, FIG. 3) of filter unit 10 is between 0.5 and 1.5 inches, but other widths could be used depending upon the application for the filter. Accordingly, it is intended to embrace all such alternatives, modifications and variations that fall within the spirit and broad scope of the appended claims.

What is claimed is:

1. An air filter comprising:

a frame;

a pleated filter element supported by the frame; and a substantially planar pre-filter formed from woven plastic strands and supported by the frame in a side-by-side relationship with the pleated filter to filter air which passes through the pleated filter.

2. The filter of claim 1, wherein the pleated filter is formed from paper.

3. The filter of claim 2, wherein the paper includes fiberglass fibers.

4. The filter of claim 1, wherein the plastic strands have different diameters and are woven such that the pre-filter has an irregular surface.

5. The filter of claim 4, wherein the plastic strands are polypropylene.

6. The filter of claim 1, wherein the frame is rectangular, and is fabricated from elongated sections having a generally U-shaped cross-section.

7. The filter of claim 1, wherein the frame is rectangular, and is fabricated from elongated sections having a generally U-shaped cross-section.

8. An air filter comprising:

a frame;

a pleated filter element supported by the frame; and a substantially planar woven, plastic mesh supported by the frame in a side-by-side relationship with the pleated filter to filter air which passes through the pleated filter.

9. The filter of claim 8, wherein the pleated filter is formed from paper.

10. The filter of claim 9, wherein the paper includes fiberglass fibers.

11. The filter of claim 9, wherein plastic mesh includes plastic strands having different diameters and are woven such that the plastic mesh has an irregular surface.

12. The filter of claim 11, wherein the plastic strands are polypropylene.

13. The filter of claim 9, wherein the frame is rectangular, and is fabricated from elongated sections having a generally U-shaped cross-section.

14. An air handling unit defining a path of airflow, the unit comprising:

a filter support; and a filter assembly supported by the support within the path of airflow through the air handling unit, the filter assembly comprising;

a frame;

a pleated filter element supported by the frame, and.

a substantially planar plastic pre-filter formed from woven plastic strands and supported by the frame in a side-by-side relationship with the pleated filter to filter air which passes through the pleated filter.

15. The filter of claim 14, wherein the pleated filter is formed from paper.

16. The filter of claim 14, wherein the plastic strands have different diameters and are woven such that the pre-filter has an irregular surface.

17. An air filter comprising:

a frame;

a pleated filter element supported by the frame; and a plastic pre-filter formed from plastic strands supported by the frame in a side-by-side relationship with the pleated filter to filter air which passes through the pleated filter, wherein the plastic strands have different diameters such that the pre-filter has an irregular surface.

18. The filter of claim 17 wherein the plastic strands are polypropylene.

19. The filter of claim 17 wherein the plastic strands are woven.

* * * * *